(12) United States Patent
Allen et al.

(10) Patent No.: US 8,171,499 B2
(45) Date of Patent: May 1, 2012

(54) APPARATUS, SYSTEM, AND METHOD FOR OBJECT CLONE EVENT NOTIFICATION

(75) Inventors: Corville O. Allen, Morrisville, NC (US); Suraksha Vidyarthi, Newark, CA (US)

(73) Assignee: International Business Machines Corporation, Armonk, NY (US)

( * ) Notice: Subject to any disclaimer, the term of this patent is extended or adjusted under 35 U.S.C. 154(b) by 1448 days.

(21) Appl. No.: 11/187,219

(22) Filed: Jul. 22, 2005

(65) Prior Publication Data

US 2007/0033594 A1    Feb. 8, 2007

(51) Int. Cl.
G06F 13/00    (2006.01)
G06F 12/02    (2006.01)

(52) U.S. Cl. ............................................ 719/318; 711/1
(58) Field of Classification Search .................. 719/318; 707/103 R, 103 Y, 103 Z, E17.005
See application file for complete search history.

(56) References Cited

U.S. PATENT DOCUMENTS

| | | | |
|---|---|---|---|
| 6,044,205 A * | 3/2000 | Reed et al. ..................... | 709/201 |
| 6,100,885 A * | 8/2000 | Donnelly et al. .............. | 715/762 |
| 6,134,559 A * | 10/2000 | Brumme et al. .......... | 707/103 R |
| 6,202,085 B1 | 3/2001 | Benson et al. ................ | 709/205 |
| 6,289,395 B1 | 9/2001 | Apte et al. .................... | 709/318 |
| 6,360,250 B1 | 3/2002 | Anupam et al. .............. | 709/204 |
| 6,363,435 B1 | 3/2002 | Fernando et al. ............. | 709/318 |
| 6,611,877 B2 | 8/2003 | Korn et al. ................... | 709/318 |
| 6,817,019 B1 | 11/2004 | Wang et al. .................. | 719/318 |
| 6,868,543 B1 | 3/2005 | Nusbickel .................... | 719/318 |
| 6,925,632 B2 * | 8/2005 | Shiu .............................. | 717/121 |
| 2002/0099688 A1 * | 7/2002 | Attaluri et al. ..................... | 707/1 |
| 2002/0163520 A1 | 11/2002 | Hardin et al. ................ | 345/475 |
| 2002/0165998 A1 | 11/2002 | Hrebejk et al. .............. | 709/318 |
| 2004/0030775 A1 | 2/2004 | Lauzon et al. ................ | 709/224 |

OTHER PUBLICATIONS

Dossier LOT920030078 "Event Notification Structure for Dynamically Aggregated Logical Components".
TBD 01-98 v41 n1 p. 465-468 "Improved Event Registration Interface".

* cited by examiner

*Primary Examiner* — S. Sough
*Assistant Examiner* — Phuong Hoang
(74) *Attorney, Agent, or Firm* — Kunzler Needham Massey & Thorpe

(57) ABSTRACT

An apparatus, system, and method are disclosed for object clone event notification. The apparatus is provided with a logic unit containing a plurality of modules configured to functionally execute the necessary steps of detecting an event on a primary software object, referencing a set of clones of the primary software object, and notifying one or more clones in the set of clones of the event in response to the event. The event may include events occurring on the primary software object, or events occurring on a software object monitored by the primary software object. These modules in the described embodiments include a detection module, a reference module, and a notification module. Beneficially, such an apparatus, system, and method would notify object clones of changes within the software system without requiring resource intensive broadcasts or implementation of a separate notification manager.

16 Claims, 8 Drawing Sheets

APPARATUS, SYSTEM, AND METHOD FOR OBJECT CLONE EVENT NOTIFICATION

BACKGROUND OF THE INVENTION

1. Field of the Invention

This invention relates to software object cloning and more particularly relates to software object clone event notification.

2. Description of the Related Art

Object oriented software development languages such as JAVA and C++ allow developers to create complex systems of software objects working together to perform specified tasks. Generally, object oriented programming simplifies many aspects of software development. However, in programs requiring multiple copies or clones of a primary software object difficulties may arise.

In such systems of software objects, communication of changes among the software objects is critical for accurate performance of software programs. For example, if a Graphical User Interface (GUI) object references data from a database, the GUI object must be notified of changes to the database to properly update displayed data. Most object-oriented software systems rely on an event-notification model to communicate changes between software objects. It is especially critical to quickly and accurately notify software objects of changes to other objects within systems that comprise multiple copies or clones of primary software objects.

One example of a system that comprises multiple clones of a primary software object is a multi-window GUI program for accessing data within a database. In this example, a metadata discovery tool may be used to discover metadata related to the data stored in the database. The metadata discovery tool may generate a metadata object which contains the metadata for attributes such as tables, columns, indexes and the like for the database. If multiple copies of the GUI, or windows within the GUI associated with the metadata object, are initiated, the metadata object may be cloned such that each GUI has its own view of the metadata. This avoids overhead in handling resource contention issues when two GUIs attempt to change the same metadata.

This example may be further complicated if one GUI modifies the metadata in the metadata object. In response to the change, the metadata discovery tool may modify or replace the original metadata object. Unfortunately, in typical systems, the clones of the original metadata object are not adequately notified of the change. Consequently, the GUIs may display erroneous or stale data.

Some attempted solutions to this notification deficiency include sweeping broadcasts of event information to objects within the system, or coordinated management of object notification by a separate notification manager. However, these solutions are not easily implemented, and may easily overwhelm system resources. For example, a general broadcast of each object notification may heavily increase system communication congestion. The resultant delays and system resource consumption may negatively impact software system performance. Implementation of a separate notification manager may require substantial development and testing time and money as well as increase hardware and software requirements.

One problem associated with clone notification occurs in situations where events on multiple primary objects need to be reflected in the clones of one of the primary objects. For example, if an order form object includes information from a product selection object and a billing information object, any changes to the product selection object and billing information object may likewise require representation on the order form object. If the order form object has multiple clones, each clone must also show the changes. In such an example, one way to update the clones is to create a direct link between each of the primary objects and each of the clones. In complex systems, this solution may not be reasonable, in part because such a solution may require modifying source code or scripts for every object in a system each time a new clone or primary object is created.

From the foregoing discussion, it should be apparent that a need exists for an apparatus, system, and method for object clone event notification. Beneficially, such an apparatus, system, and method would notify object clones of changes within the software system without requiring resource intensive broadcasts, implementation of a separate notification manager, or multiple direct links between clones and various system objects.

SUMMARY OF THE INVENTION

The present invention has been developed in response to the present state of the art, and in particular, in response to the problems and needs in the art that have not yet been fully solved by currently available software products. Accordingly, the present invention has been developed to provide an apparatus, system, and method for object clone event notification that overcome many or all of the above-discussed shortcomings in the art.

The apparatus for object clone event notification is provided with a logic unit containing a plurality of modules configured to functionally execute the necessary steps of detecting an event on a primary software object, referencing a set of clones of the primary software object, and notifying one or more clones in the set of clones of the event in response to the event. These modules in the described embodiments include a detection module, a reference module, and a notification module.

A system of the present invention is also presented for object clone event notification. In one embodiment, the system includes an application server configured to load and operate an application comprising one or more primary software objects. Additionally, the system may include one or more software object interfaces configured to use the primary software object to perform a task. The system may also include a primary software object configured to detect an event on the primary software object, reference a set of clones of the primary software object, and notify a clone in the set of clones of the event. In one further embodiment, the system may include a clone configured to listen for event notifications from the primary software object.

In one embodiment, the primary software object may further comprise a primary listener for detecting events. The primary listener may be further configured to reference a set of listeners associated with the software object clones. Each listener may be configured to listen exclusively for notifications from the primary software object. In certain embodiments, the system may further comprise a clone generator configured to generate a clone of a primary software object, wherein generating comprises creating a new instance of the primary software object, copying the attributes of the primary software object to the new instance of the primary software object, generating a clone event listener associated with the software object, wherein the new listener is distinct from the primary event listener. Additionally, generating may comprise adding the clone event listener to the set of listeners referenced by the primary listener. In one further embodiment, the primary software object handles notification to the associated clones independent of a separate event manager.

A method of the present invention is also presented for object clone event notification. The method in the disclosed embodiments substantially includes the steps necessary to carry out the functions presented above with respect to the operation of the described apparatus and system. In one further embodiment, the method includes detecting an event of a monitored software object by a primary software object, and communicating the event from the primary software object to a clone object, wherein the communication is exclusive of a direct communication link between the monitored object and the clone object.

In a further embodiment, the method includes notifying a subsequent clone in a chain of clones wherein each clone notifies a subsequent clone until each clone in the chain of clones has been notified of the event. Alternatively, notification may comprise simultaneously notifying clones associated with the primary software object of an event.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
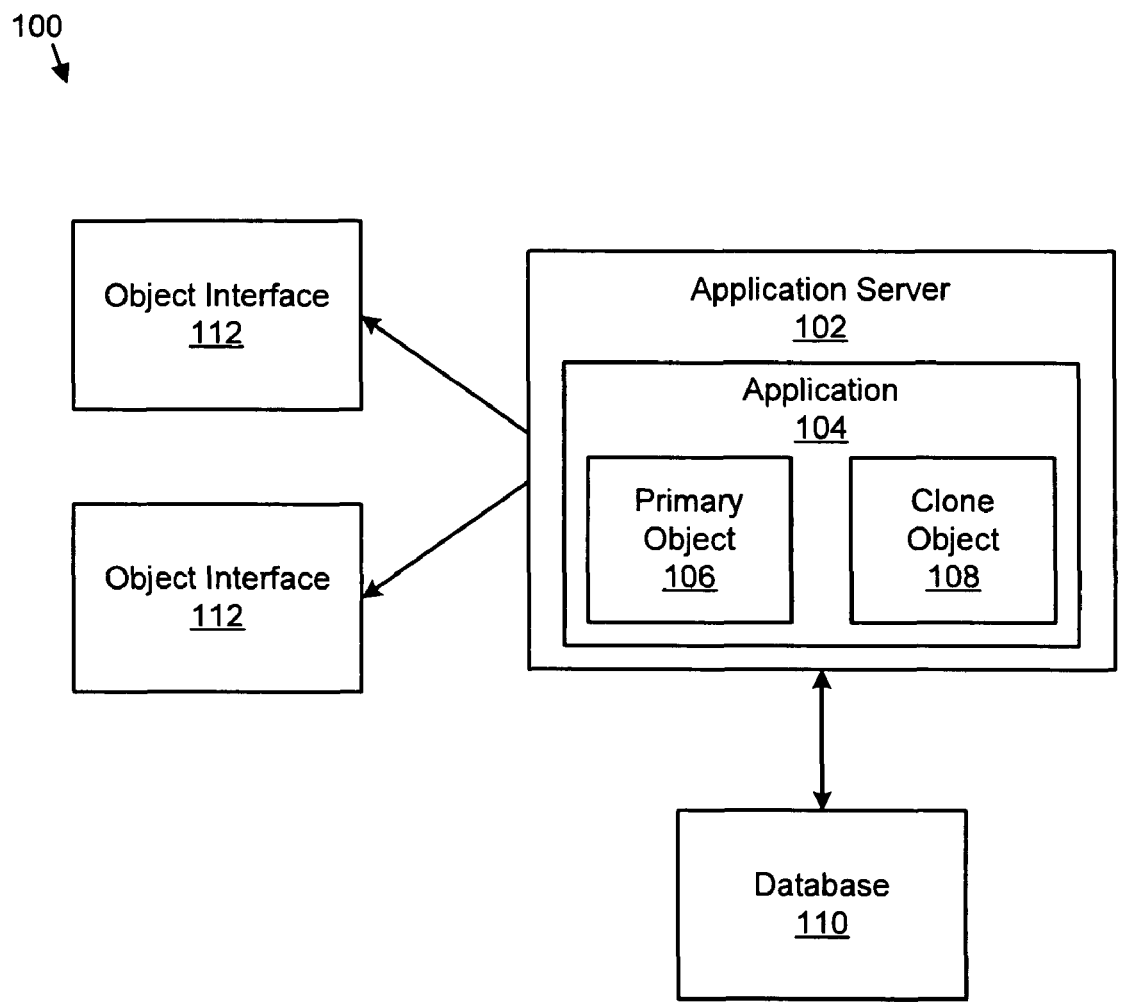
FIG. 1 is a schematic block diagram illustrating one embodiment of a system for object clone event notification in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. As used herein, the term "event" refers to a change, update, action, command, reorganization, modification, communication, selection, or the like occurring in relation to a particular software object of an application. The term "primary software object" refers to an original or authentic software object from which copies or clones may be generated. The term "clone" or "cloned software object" as used herein refers to a copy, duplicate, image, or other form of reproduction of a primary software object. In one specific embodiment, the clone may contain an exact duplicate of data, methods, commands, or other like features of the primary software object.

Reference to a signal bearing medium may take any form capable of causing execution of a program of machine-readable instructions on a digital processing apparatus. A signal bearing medium may be embodied by a compact disk, digital-video disk, a magnetic tape, a Bernoulli drive, a magnetic disk, a punch card, flash memory, integrated circuits, or other digital processing apparatus memory device.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts a system 100 for object clone event notification. In one embodiment, the system 100 includes an application server 102 configured to run an application 104 developed for an object oriented environment. The application 104 comprises, in one embodiment, one or more primary objects 106 and one or more clone objects 108. Additionally, the application server 102 may be configured to communicate with a database 110. The application server 102 may be further configured to serve software objects to and service requests from one or more object interfaces 112. Alternatively, the primary objects 106 and one or more clone objects 108 may exist in other software environments. For example, the primary objects 106 and one or more clone objects 108 may operate within a tooling environment. The tooling environment may be used to discover and manipulate metadata of a database 110 or other Enterprise Information System (EIS).

In one embodiment, the application server 102 provides the physical hardware necessary to perform the operations of the software application 104. The application server 102 may comprise one or more data processors, a Random Access Memory (RAM) device, a persistent data storage device such as a hard disk, a data bus, a power supply, and the like. In certain embodiments, the application server 102 may include an operating system which provides coordination between hardware components and software applications 104. In one embodiment, the application server 102 may host a metadata discovery application 104 for discovery of metadata of an attached database 110. Alternatively, the application server 102 may comprise a web server for hosting web applications 104 or other type of application server.

An application 104 may include a combination of software objects 106, 108 organized in a complex system of object interactions. In certain embodiments, the application 104 may include an operating system or hardware interface such as a JAVA virtual machine, one or more object or class loaders, and one or more modules comprising software objects 106, 108. The modules may comprise one or more primary software objects 106, and optionally one or more copied or cloned software objects 108. The software objects 106, 108 may interact according to a preprogrammed set of instructions or application code.

In one embodiment, the primary software object 106 is an original or master software object. In certain embodiments, the primary software object 106 may include data to be processed by other objects within the application. Additionally, the primary software object 106 may include one or more functions or methods for performing predefined operations. For example, the primary software object 106 may include a method for generating clones 108 of the primary software object 106. In another embodiment, the primary software object 106 may include a function for listening for data updates from other objects within the system 100. Primary software objects 106 are discussed in more detail with relation to FIG. 3.

A clone software object 108 may include a copy of the data or commands in the primary software object 106. However, if changes are made to the primary software object 106, the changes must be communicated to the clones 108 to maintain consistency and accuracy of data and operation. In one embodiment, the primary software object 106 may notify its clones 108 of changes as they are detected. A more detailed description of the clone software objects 108 is discussed with relation to FIG. 3.

In one embodiment, the application server 102 is in data communication with one or more peripheral devices. For example, the application server 102 may provide data communication between the application 104 and a database 110. Of course the application 104 in certain embodiments, may communicate with a variety of different computer systems including enterprise information systems (EIS) such as databases and legacy computer systems. In another embodiment, the application 104 may include or communicate with one or more object interfaces 112 such as a GUI display. In such an embodiment, the object interfaces 112 uses the software objects 106, 108 to present, process, or store data used by the application 104. Alternatively, the peripheral device may include another application server, a web server, and the like.

One example of the system 100 includes an Enterprise Metadata Discovery (EMD) application 104 connected to an Enterprise database 110 and a GUI display 112. In one embodiment, multiple GUI displays 112 may be open simultaneously. In this example, a primary metadata object 106 may be generated by the application 104 for providing the GUI displays 112 with data stored on the database 110. The metadata object 106 maintains the data on the application 104 such that subsequent calls to the database 110 are not needed. One or more clone metadata objects 108 may be generated by the primary object 106 for providing each GUI display 112 a view of the metadata. In this example, the clones 108 are notified of any metadata changes detected by the primary software object 106, and the GUI displays 112 are updated accordingly. The metadata may be changed by a GUI display 112 or by various other software packages (not shown) that may be connecting to the database 110. The details of generating and notifying the clones 108 are discussed further in the paragraphs below.

Figure 2:
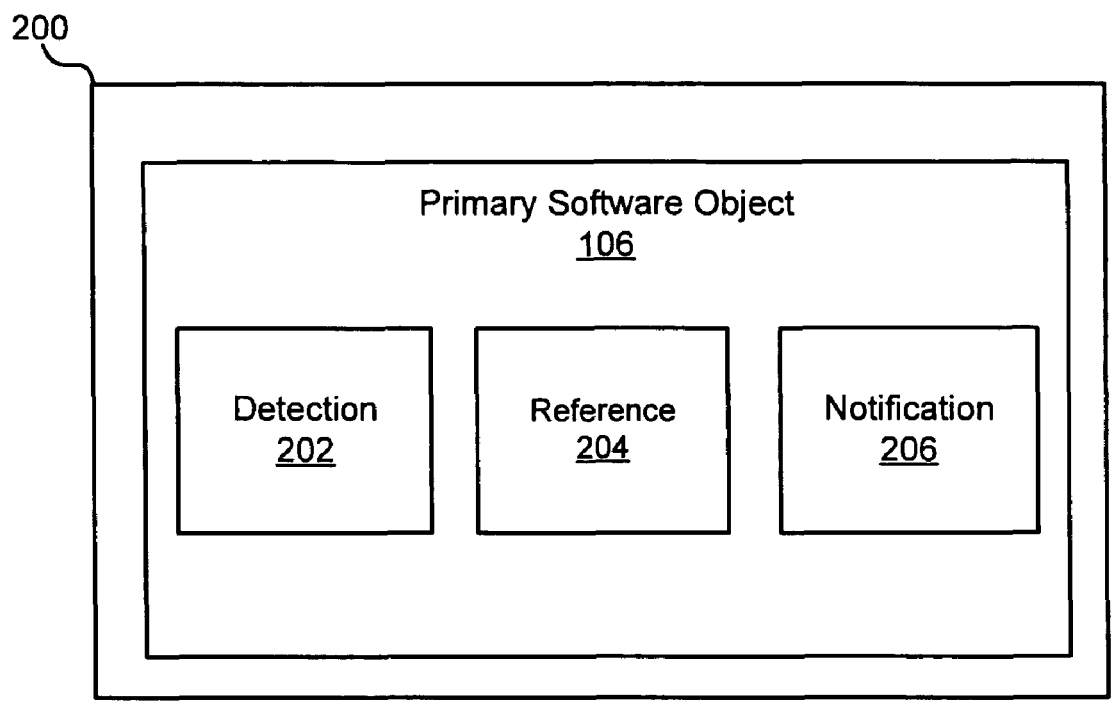
FIG. 2 is a schematic block diagram illustrating one embodiment of an apparatus for object clone event notification.

FIG. 2 illustrates one embodiment of an apparatus 200 for object clone event notification. In the depicted embodiment, the apparatus 200 includes a detection module 202, a reference module 204, and a notification module 206. These modules may carry out the necessary steps of detecting an event on a primary software object, referencing a set of clones associated with the primary software object, and notifying one or more clones in the set of clones of the event. In one embodiment, the notification is initiated by the primary software object.

In one embodiment, the detection module 202 is configured to detect an event on a primary software object 106. Of course, the detection module 202 may be configured to detect events for other software objects 106 in the system 100. In one embodiment, the detection module 202 may load and run a primary listener object to detect the events. The primary listener object is described in more detail with relation to FIG. 3. Alternatively, the detection module 202 may tap intra-system communications to detect an event. In an alternative embodiment, the detection module 202 may actively probe for altered object values within the system 100.

Once an event has been detected by the detection module 202, the reference module 204 is configured to reference a set of clones 108 associated with the primary software object 106. The set of clones 108 may comprise pointers to clone objects, clone names, and other clone identifiers stored in a variety of types of data structures. Alternatively, the data structure may hold the actual clone objects. The reference module 204 traverses this set of clones 108 to identify each clone 108 within the set. The reference module 204 is configured to enable communication between the primary software object 106 and each of the clones 108.

In one embodiment, the set of clones is stored as a linked list of clone objects 108 on the primary object 106. Alternatively, the set of clones may be stored as a lookup table, an array of pointers, a set of system addresses, or the like. The set of clones may be stored local to the primary software object 106 or in a remote storage location. The reference module 204 may look up one or more clone objects 108 associated with the primary software object 106.

In one embodiment, the notification module 206 notifies one or more clones 108 in the set of clones of the event in response to the event. The notification may be initiated by the primary software object 106. Preferably, the detection module 202 signals the notification module 206 to notify the clones 108 in the set of clones 108. In one embodiment, the notification module 206 executes a method of the primary software object 106 configured to notify the object clones 108 listed in the set of clones of the event. Typically, the notification is implemented by executing a method of the object clones 108. In one further embodiment, the notification may be communicated through listener objects associated with the primary software object 106 and the clone software objects 108. The listener objects are discussed in more detail with relation to FIG. 3.

In one embodiment, the apparatus 200 comprises hardware and operating system components of the application server 102 required to load and operate the primary software object 106 and its associated methods and functions. In FIG. 2, the modules of the apparatus 200 are defined by the methods of the primary software object 106 loaded by the application server 102. Thus, in one embodiment, the apparatus 200 may be a physical manifestation of the primary software object 106. Of course the primary software object 106 may include other modules as well.

Figure 3:
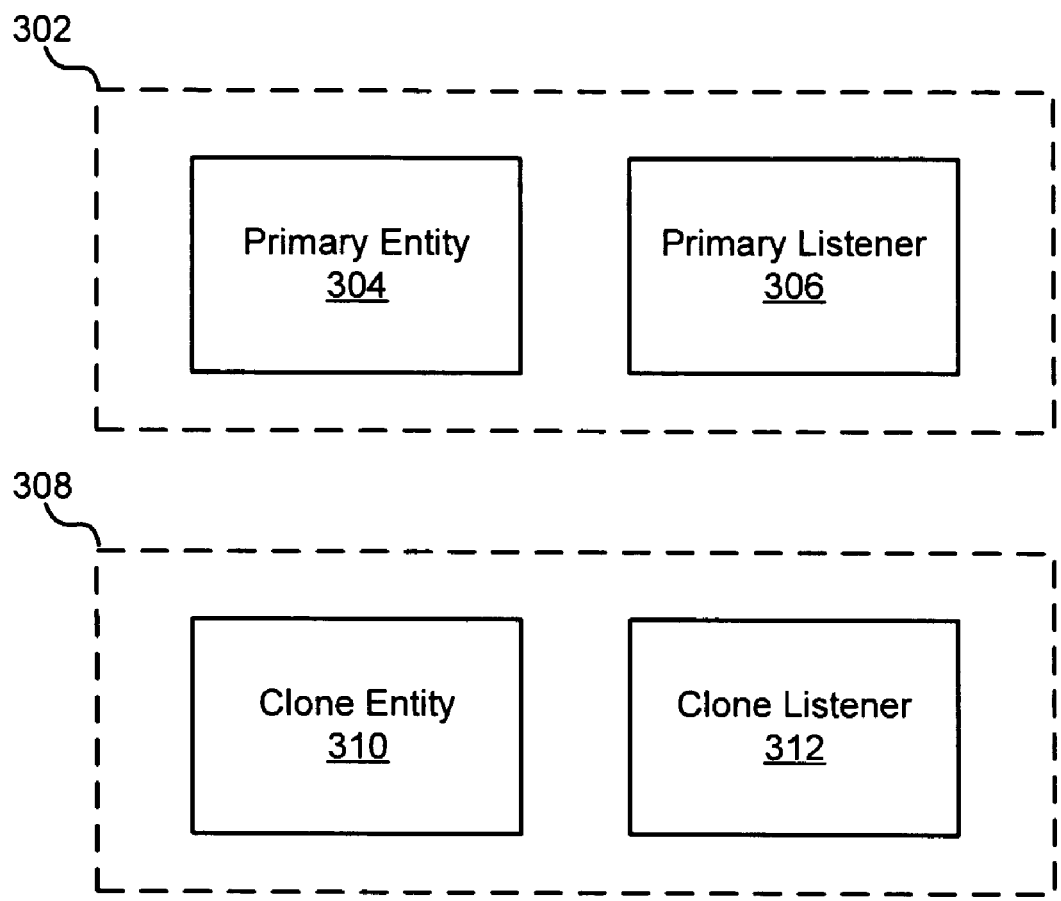
FIG. 3 is a schematic block diagram illustrating the structure of a primary software object and a clone software object.

FIG. 3 illustrates one embodiment of a primary software object 302 and a clone 308 of the primary software object 302. In one embodiment, the primary software object 302 comprises a primary entity 304 and a primary listener 306. The primary entity 304 may contain object data, methods for interacting with the primary listener 306, and other methods or functions for performing the desired operations of the primary software object 302.

The primary listener 306 monitors the primary entity for certain events. In addition, or alternatively, the primary listener 306 may monitor external objects for certain predefined events such as an event. The primary listener 306 may include a reference to the primary entity 304. The reference may be used to communicate detected events to the primary entity 304. The primary listener 306 may execute methods of the primary entity 304 in response to a detected event. In one further embodiment, the primary listener 306 may include a link to a set of clone listeners 312. The link may comprise a linked list of objects, a list of addresses, a list of object names, a list of clone object method names, or the like. The primary listener 306 may notify clone listeners 312 in the set of clone listeners of detected events.

In one embodiment, the software object clone 308 includes a clone entity 310 and a clone listener 312. The clone entity 310 may comprise an exact copy of data fields, data field values stored in the primary entity 304. Additionally, the clone entity 310 may comprise copies of methods or functions implemented by the primary entity 306. The clone entity 310 can then be used to present an accurate representation of the primary entity 304 to other software including object interfaces 112, discussed above.

The clone listener 312 may be configured to listen for notifications from the primary listener 306. In one embodiment, the clone listener 312 listens exclusively for notifications from the primary listener 306. In such an embodiment, orderly updates of clones 308 in response to events on a primary software object 302 may be achieved. Alternatively, or in addition, the clone listener 312 may also listens for events from other external objects. Typically, the clone listener 312 is a method of the clone 308 that is made available for the primary listener to execute. Once executed, the clone listener 312 may execute one or more other methods of the clone entity 310 in response to the event notification.

Figure 4:
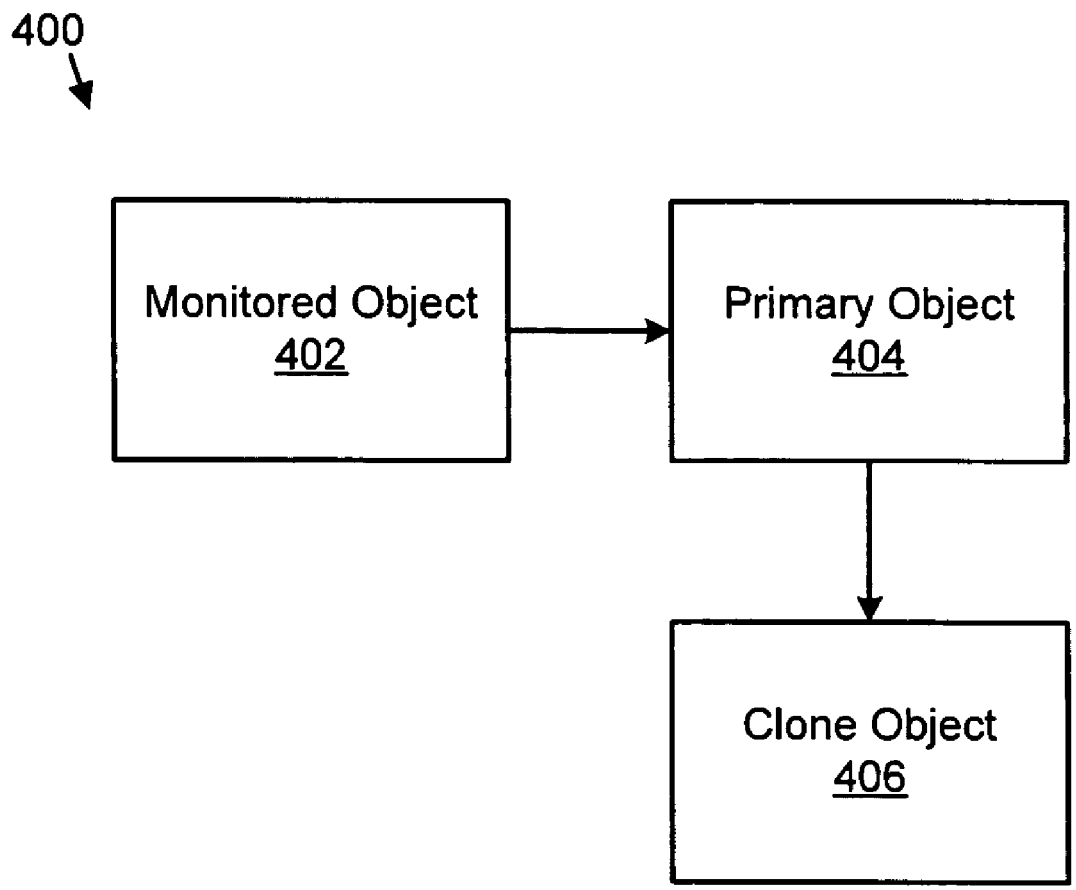
FIG. 4 is a schematic block diagram illustrating a system for indirect event notification.

FIG. 4 illustrates one embodiment of a system 400 for indirect event notification. The system 400 includes a monitored software object 402, a primary software object 404, and a clone software object 406. In one embodiment, one or more clone software objects 406 may be notified of changes occurring on the monitored software object 402 without requiring direct communication between the monitored object 402 and the clone objects 406. In such an embodiment, the primary object 404 may monitor the monitored object 402 for changes. In an alternative embodiment, the monitored object 402 may send notification of events to the primary object 404 in response to the event. Typically, the monitored object 402 passes an event object to the listener of the primary object 404. However, advantageously, the monitored object 402 does not need to send notification of events to the clones 406 of the primary object 404.

As discussed in the Background section above, problems occur when clones 406 of primary objects 404 are introduced into a system 400. The clones 406 typically will not include a reference to the monitored object 402. So any events on the monitored object 402 may not be reflected communicated to the clone 406 as desired. It is difficult and error prone to modify the code of every monitored object 402 to include a direct reference to every clone 406 of every primary object 404 in a system 400 dynamically. The solution provided by the present invention allows the primary object 404 to monitor the monitored object 402 as usual, and then allow the primary object 404 to notify each of the its clones 406 when an event occurs on the monitored object 402.

In one embodiment, the primary object 404 relays event information, such as the event object collected from the monitored object 402 to the clone 406. In this embodiment, the properties of the clone 406 remain consistent with the primary software object 404. The primary object 404 may notify the clone object 406 when the primary object 404 receives a notification of an event on the monitored object 402. Alternatively, the clone object 406 may periodically check the primary object 404 for changes or updates. The primary object 404 is responsible to notify each of its dependent clones 406 of pertinent events occurring within the system 400.

Figure 5A:
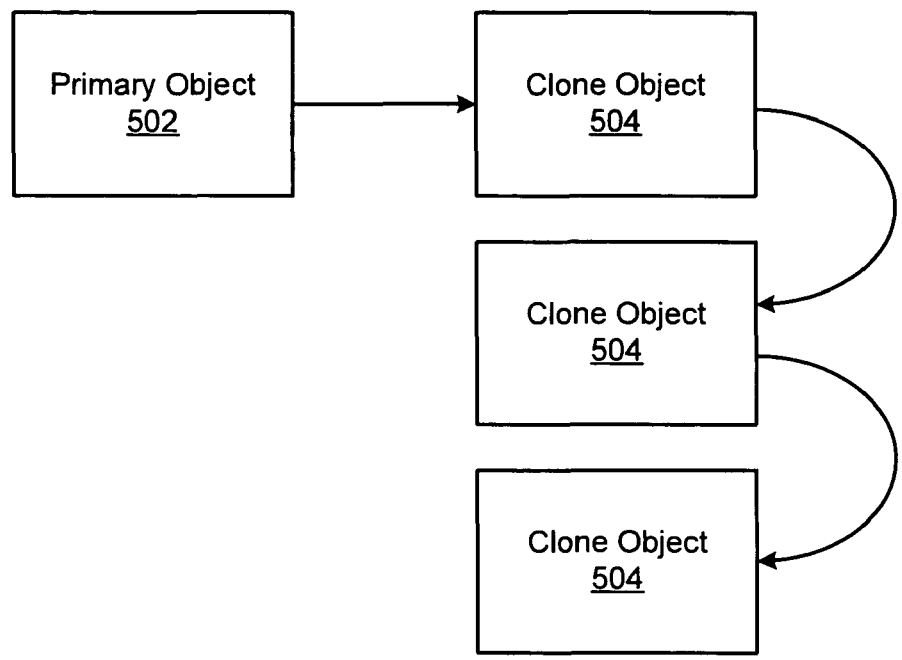
FIG. 5A is a schematic block diagram illustrating series event notification.

FIG. 5A illustrates one embodiment of series event notification. As used herein, the term "series event notification" refers to event notification occurring sequentially through a chain or sequential list of clone objects 504. In one embodiment, the primary object 502 may reference a pointer to a first clone object 504 in a chain of clone objects 504. The primary object 502 may then notify the first clone object 504 of an event. The first clone object 504 may then notify a subsequent clone object 504 until each clone object 504 in the chain has been notified. In such an embodiment, the primary software object 502 may reference a pointer or address to a first clone object 504. The first clone object 504 may reference a pointer to a second clone object 504, and so on until the chain is completely notified. In an alternative embodiment, the primary object 502 may include a linked list, set of pointers, set of addresses, or the like which the primary object 502 and the clones 504 reference to determine the sequence of notification.

Figure 5B:
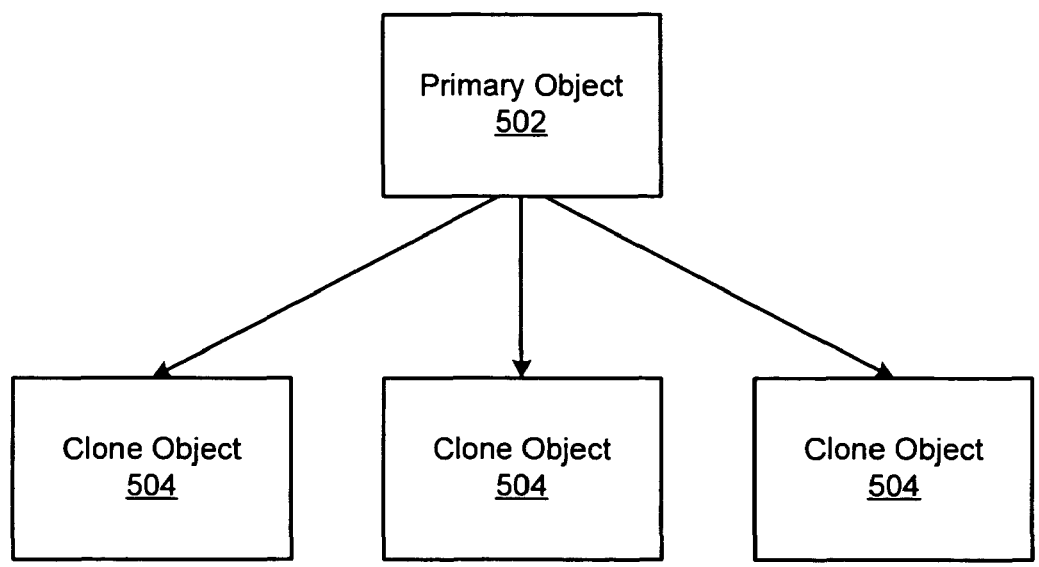
FIG. 5B is a schematic block diagram illustrating parallel event notification.

FIG. 5B illustrates an alternative embodiment of event notification. In this embodiment, the primary object 502 notifies the clone objects 504 substantially simultaneously. This embodiment of event notification may be referred to as parallel notification, wherein each clone object 504 is notified by the primary object 502 of the event in a substantially parallel or simultaneous set of notification actions. The primary object 502 may reference a set of addresses or pointers to the clone objects 504. As with series notification, the primary object may reference a linked list, array of pointers or addresses, file containing addresses or the like. The primary object 502 may then broadcast an event notification substantially simultaneously to each of its clone objects 504.

Figure 6:
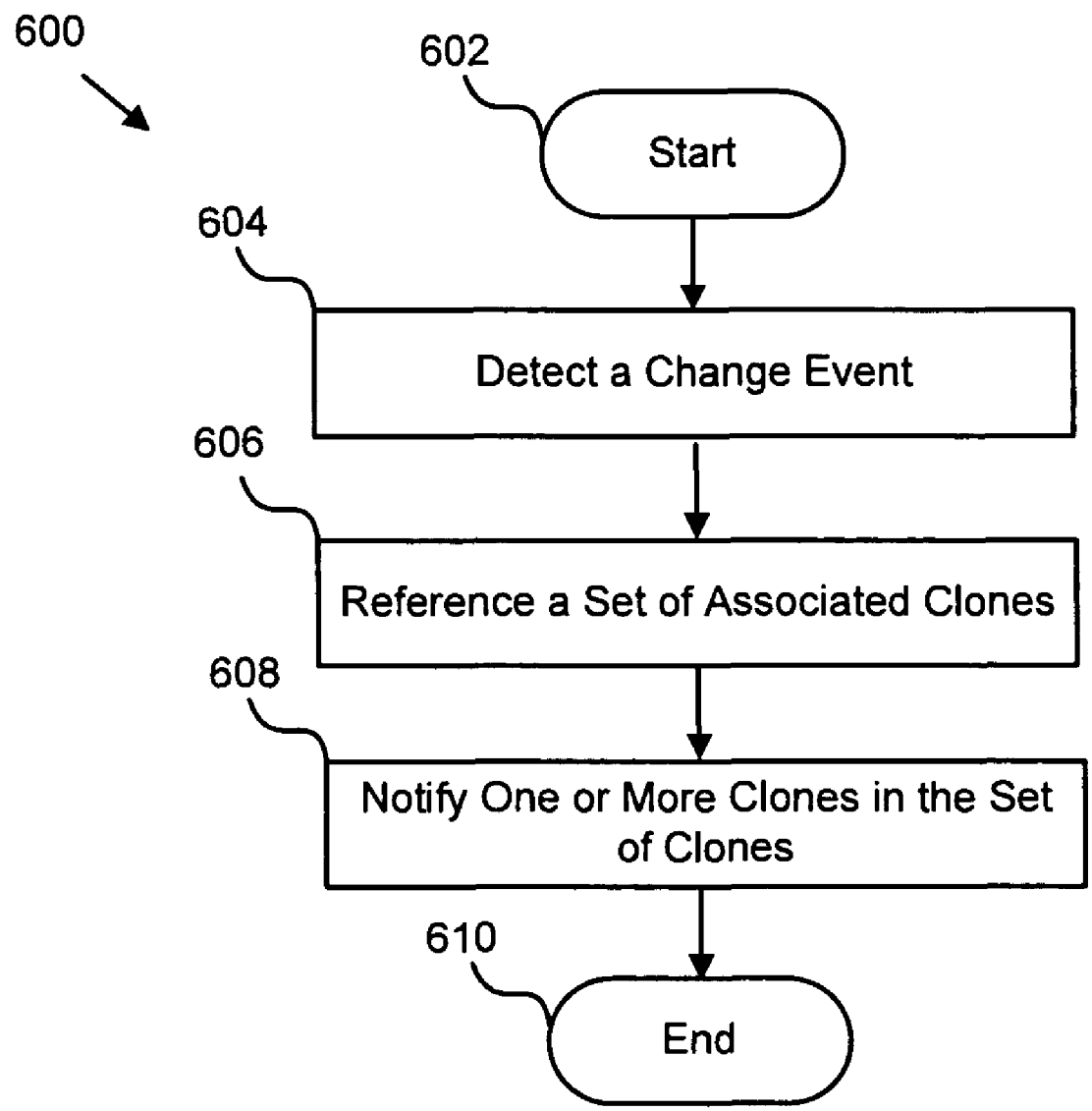
FIG. 6 is a schematic flow chart diagram illustrating one embodiment of a method for object clone event notification.

FIG. 6 illustrates one embodiment of a method 600 for object clone event notification. In one embodiment, the method 600 starts 602 when the primary object 106 detects 604 an event. In another embodiment, the primary listener 306 associated with the primary object may detect 604 the event. The primary object 106 then references 606 a set of clone objects 108. The primary object 106 may only reference the clone objects 108 originating from the primary object 106 or clone objects 108 that be optionally assigned to the set of clone objects. The primary object 106 may then notify 608 its clone objects 108 of the event, and the method 600 ends.

For example, a primary metadata object 106 containing metadata relating to a database 110 may detect 604 changes to the metadata. If clones 108 of the primary metadata object 106 have been generated, the primary metadata object 106 may reference 606 a list of the clone objects 108 and notify 608 the clone objects 108 simultaneously. Alternatively, the primary metadata object 106 may trigger a chain notification 608 of the clone objects 108.

Figure 7:
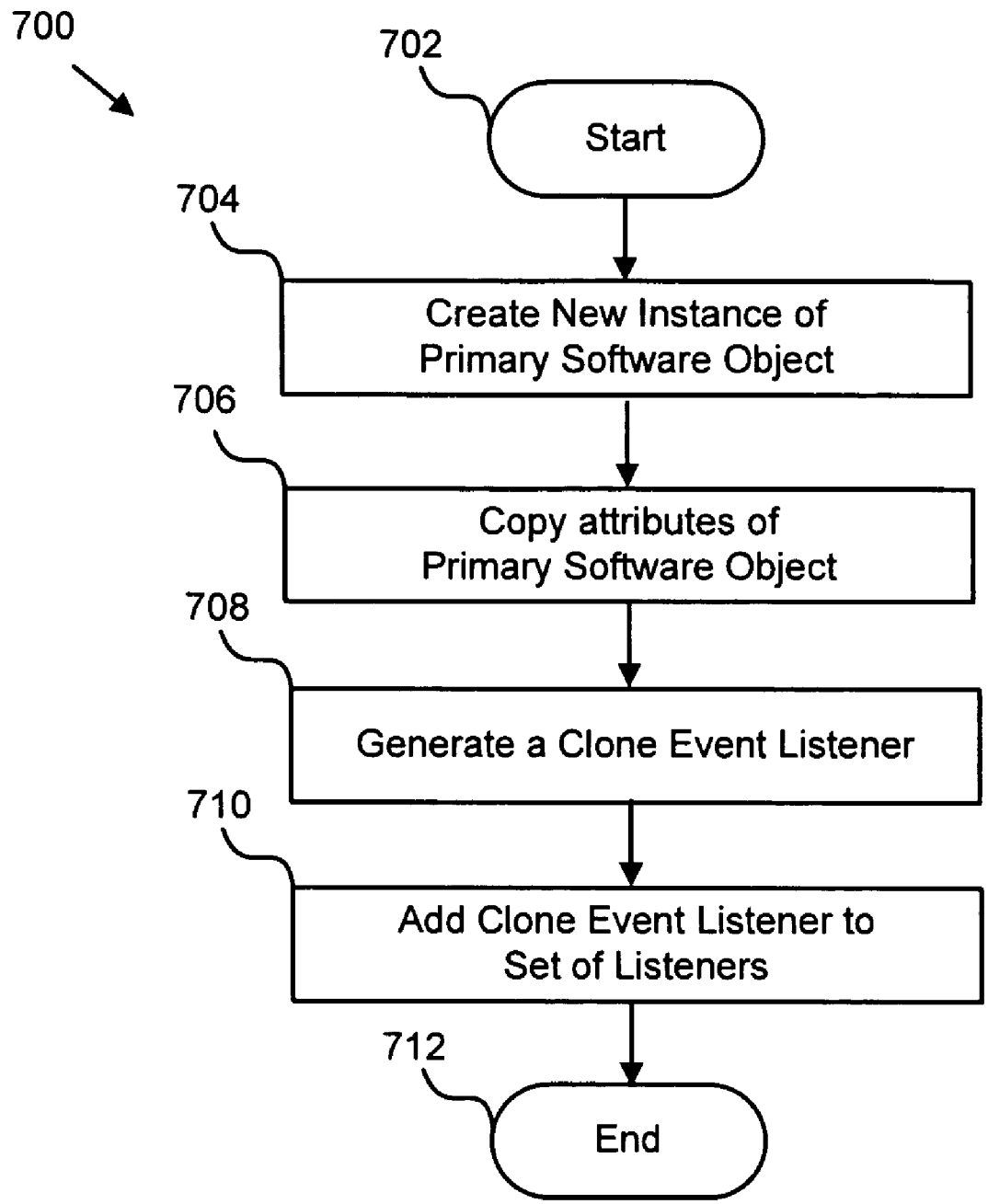
FIG. 7 is a schematic flow chart diagram illustrating one embodiment of a method for generating object clones.

FIG. 7 illustrates one embodiment of a method 700 for generating object clones 308. In one embodiment, the method 700 may be carried out by a generation module (not shown). The generation module may be a method defined in or initiated by the primary entity 304. Alternatively, the generation module may be an additional hardware module of the apparatus 200.

In one embodiment, the method 700 starts 702 by creating 704 a new instance 308 of a primary software object 302. In one embodiment, this includes creating 704 a new instance of the primary entity 304. The attributes of the primary software object 302 are then copied 706 to the new instance of the software object 308. In one embodiment, the clone entity 310 includes copied field values from the primary entity 304. A clone listener 312 associated with the clone entity 310 is then generated 708. Consequently, the new instance 308 is substantially the same as a cloned object however, the clone listener 312 is preferably different from the primary event listener 306 of the primary software object. In one embodiment, the clone event listener 312 is separate and distinct from the primary event listener 306. The clone event listener 312 is then added 710 to a set of clone listeners 312. In one embodiment, the set of clone listeners 312 is stored on the primary event listener 306.

In this example, the clone listener 312 is used for illustrative purposes only. Indeed, in systems wherein clones 308 do not include clone listeners 312 the clone 308 may receive notifications from the primary object 302 without the use of a clone listener 312.

Figure 8:
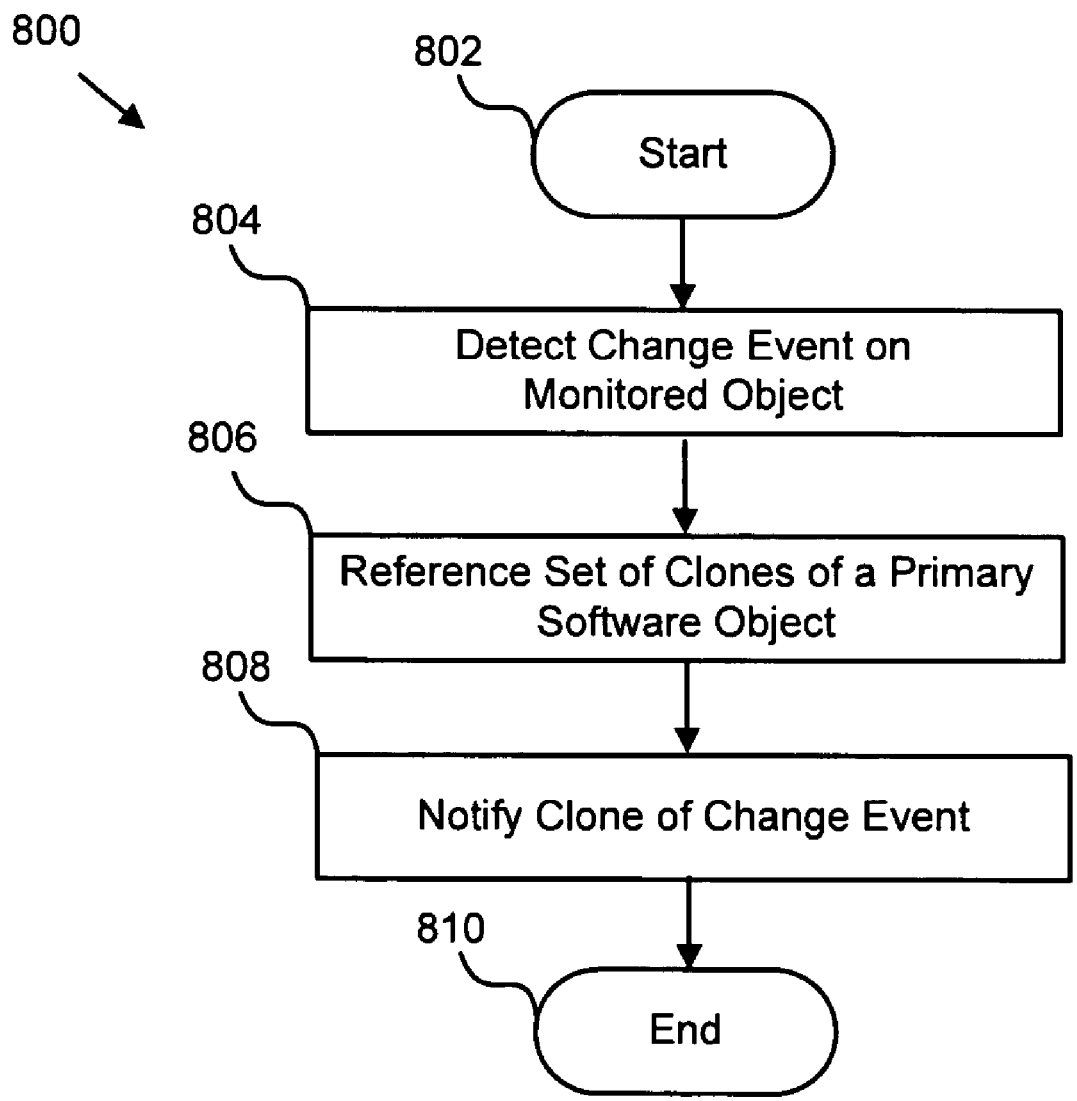
FIG. 8 is a schematic flow chart diagram illustrating one embodiment of a method for indirect event notification.

FIG. 8 illustrates one embodiment of a method 800 for indirect event notification. The method 800 starts 802 when the primary object 404 detects 804 an event on a monitored object 402. The monitored object 402 may communicate the event to the primary object 404 independently, or in response to a request from the primary object 404. The primary object 404 then references 806 a set of clone objects 406. In one embodiment, the clone objects 406 are clones of the primary software object 404. The primary object 404 may then notify 808 the clone 406 of an event on the monitored object 402 which may affect the clone object 406, and the method 800 ends.

Beneficially, the disclosed embodiments of the apparatus, system and method for object clone event notification would notify object clones of changes within the software system without requiring resource intensive broadcasts or implementation of a separate notification manager. Additionally, the disclosed embodiments may provide the added benefit of allowing indirect communication of event information between a monitored software object and a clone of a primary software object.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer readable storage medium embodying a program of machine-readable instructions executable by a digital processing apparatus to perform an operation for object clone event notification, the operations comprising:

a detection operation initiated by a primary listener of a primary software object, the primary listener configured to detect an event, during runtime of an application running on a processor, the application comprising the primary software object and a set of clones of the primary software object, the event occurring on an attribute of the primary software object;

a reference operation configured to reference the set of clones of the primary software object, each clone in the set of clones comprising an exact duplicate of a plurality of attributes, attribute data values, and methods of the primary software object, the set of clones stored as a set of system addresses associated with the primary software object; and a notification operation initiated by the primary software object independent of a separate event manager, the primary software object configured to notify one or more clones in the set of clones, during runtime of the application, of the event in response to the event, each of the one or more clones of the primary software object configured to maintain, within the application, an exact duplication of the plurality of attributes, attribute data values, and methods of the primary software object in response to the notification such that each of the one or more clones accurately represents the primary software object;

wherein the digital processing apparatus performs the operations by way of one or more of logic hardware comprising a processor and computer readable memory and executable code, the executable code stored on a computer readable storage medium.

2. The computer readable storage medium of claim 1, wherein the reference operation further comprises an operation to reference a set of listeners associated with the set of clones, each listener configured to listen exclusively for notifications from the primary software object.

3. The computer readable storage medium of claim 2, wherein the instructions further comprise an operation to generate a new clone of the primary software object, the operation comprising:
    creating a new instance of the primary software object;
    copying the plurality of attributes and attribute data values of the primary software object to the new instance of the primary software object to create the new clone;
    generating a clone event listener associated with the new clone of the primary software object, wherein the new listener is distinct from the primary listener; and
    adding the clone event listener to the set of listeners.

4. The computer readable storage medium of claim 1, wherein the notification operation further comprises notifying a subsequent clone in a chain of clones, wherein each clone notifies a subsequent clone until each clone in the chain of clones has been notified of the event.

5. The computer readable storage medium of claim 1, wherein the notification operation further comprises simultaneously notifying the clones in the set of clones of the event.

6. The computer readable storage medium of claim 1, wherein the operations are performed independent of the separate event manager.

7. The computer readable storage medium of claim 1, wherein the operations are carried out by a logic unit containing a plurality of modules comprising:
    a detection module configured to detect the event on the primary software object;
    a reference module configured to reference the set of clones; and
    a notification module configured to notify the one or more clones in the set of clones of the event.

8. A method for object clone event notification, the method comprising:
    detecting an event of a monitored software object by a primary listener of a primary software object during runtime of an application running on a processor, the application comprising the primary software object and one or more clones of the primary software object, the primary software object residing within computer readable memory accessed by the processor, the set of clones stored as a set of system addresses associated with the primary software object; and
    communicating, independent of a separate event manager, a notification of the event from the primary software object to the one or more clones of the primary software object during runtime of the application, each clone comprising an exact duplicate of a plurality of attributes, attribute data values, and methods of the primary software object, each of the one or more clones of the primary software object configured to maintain, within the application, an exact duplication of the plurality of attributes, attribute data values, and methods of the primary software object in response to the notification such that each of the one or more clones accurately represents the primary software object;
    wherein the communication is carried out exclusive of a direct communication link between the monitored software object and the clones of the primary software object.

9. The method of claim 8, wherein referencing further comprises referencing a set of listeners associated with the one or more clones, each listener configured to listen exclusively for notifications from the primary software object.

10. The method of claim 9, further comprising generating a new clone of the primary software object, wherein generating comprises:
    creating a new instance of the primary software object;
    copying the plurality of attributes and attribute data values of the primary software object to the new instance of the primary software object to create the new clone;
    generating a clone event listener associated with the new clone of the primary software object, wherein the new listener is distinct from the primary listener; and
    adding the clone event listener to the set of listeners.

11. The method of claim 8, wherein communicating further comprises notifying a subsequent clone in a chain of clones, wherein each clone notifies a subsequent clone until each clone in the chain of clones has been notified of the event.

12. The method of claim 8, wherein communicating further comprises simultaneously notifying the one or more clones of the event.

13. The method of claim 8, wherein the change event is communicated directly to each clone independent of the separate event manager.

14. A system for object clone event notification, the system comprising:
    an application server comprising a processor and computer readable memory, the application server configured to load and operate an application comprising a primary software objects and a set of clones of the primary software object;
    one or more software object interfaces configured to use the primary software object to perform a task; and
    the primary software object configured to:
        detect, using a primary listener of the primary software object, an event on an attribute of the primary software object during runtime of the application;
        reference the set of clones of the primary software object, each clone in the set of clones comprising an exact duplicate of a plurality of attributes, attribute data values, and methods of the primary software object, each clone in the set of clones corresponding to a different graphical user interface ("GUI") display of the application, each GUI display providing a view of at least a portion of the attribute data values from a corresponding clone in the set of clones, the set of clones stored as a set of system addresses associated with the primary software object; and notify, independent of a separate event manager, a clone in the set of clones of the event during runtime of the application; and one or more clones in the set of clones configured to listen for event notifications from the primary software object, each of the one or more clones configured to maintain, within the application, an exact duplication of the plurality of attributes, attribute data values, and methods of the primary software object in response to the event notification such that each of the one or more clones accurately represents the primary software object, each of the one or more clones further configured to update a GUI display corresponding to the clone in response to the clone receiving the event notification.

15. The system of claim 14, wherein the primary listener is further configured to reference a set of listeners associated with the set of clones, each listener configured to listen exclusively for notifications from the primary software object.

16. The system of claim 15, further comprising a clone generator configured to generate a new clone of the primary software object, wherein generating comprises:

creating a new instance of the primary software object;

copying the plurality of attributes and attribute data values of the primary software object to the new instance of the primary software object to create the new clone;

generating a clone event listener associated with the new clone of the primary software object, wherein the new listener is distinct from the primary listener; and adding the clone event listener to the set of listeners.

\* \* \* \* \*